A. MINNEMANN.
MACHINE FOR CUTTING DISKS OF CORK OR SIMILAR MATERIAL.
APPLICATION FILED JUNE 29, 1914.

1,235,226.

Patented July 31, 1917.

Witnesses:

Inventor:

UNITED STATES PATENT OFFICE.

AUGUST MINNEMANN, OF DELMENHORST, GERMANY.

MACHINE FOR CUTTING DISKS OF CORK OR SIMILAR MATERIAL.

1,235,226.                     Specification of Letters Patent.        Patented July 31, 1917.

Application filed June 29, 1914.   Serial No. 847,953.

*To all whom it may concern:*

Be it known that I, AUGUST MINNEMANN, a subject of the Grand Duke of Oldenburg, residing at Delmenhorst, in the Grand Duchy of Oldenburg, German Empire, have invented certain new and useful Improvements in Machines for Cutting Disks of Cork or Similar Material, of which the following is a specification.

This invention relates to a machine for cutting disks from rods of cork or similar material. With machines of this type there is generally used a circular cutting blade to which the rods to be cut are fed by means of a turning platform on which said rods are maintained by means of special holding devices. The working material in form of rods or bars is pressed against an adjustable abutment which determines the thickness of the disk to be cut off, special clamping devices being provided for maintaining the working pieces in the holders. According to the invention there is substituted for said clamping devices a ring-shaped abutment situated under the holding device of the turning platform. This ring-shaped abutment is mounted on the frame of the machine so that its position can be regulated. In order to prevent chips of the material cut off from getting under the working pieces, a blade spring is arranged according to the invention, which is situated above the abutment ring behind the circular cutting blade so that it reaches into the path of the working pieces and removes remnants of cork from said abutment ring. At either side of said blade spring inclines are arranged for maintaining the working pieces, the abutment ring further has apertures through which said chips can fall out.

In the accompanying drawings the invention is shown by way of example:—

Figure 1:
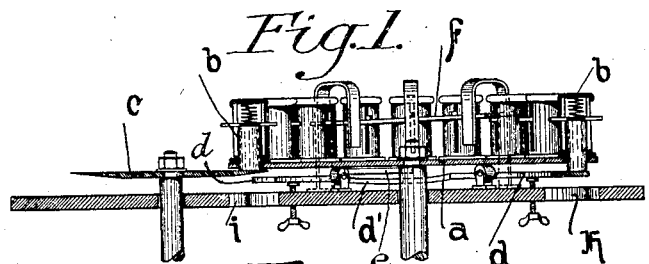
Figure 1 is a longitudinal section of the machine.
Figure 2:
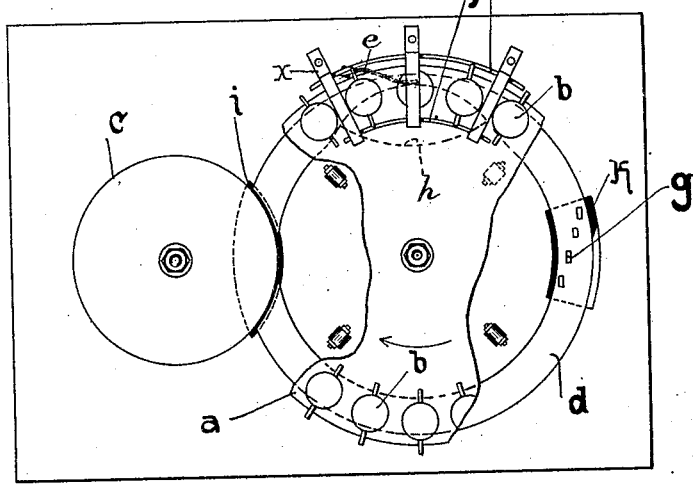
Fig. 2 is a plan view of the same.
Figure 3:
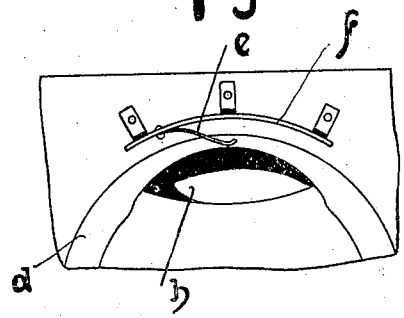
Fig. 3 is a plan view, the turning platform being suppressed.

On the turning platform $a$ holding devices are arranged in a circle which devices consist for example of vertical tubes $b$ made from sheet metal, the rapidly rotating cutting disk $c$ slightly projects into the path of the holders $b$. The bars or rods of cork placed in said tubular holders $b$ project through the turning platform $a$ and bear on the abutment ring $d$. This abutment ring is movably mounted on the frame of the machine so that its distance from the cutting blade $c$ can be regulated according to the thickness of the disks to be cut off. The disks cut off from the working pieces by the rotating knife $c$ drop through holes $i$ of the table, the abutment ring $d$ being interrupted at the part where the segment of the rotating knife $c$ projects over said ring. To the frame of the machine a blade spring $e$ is fixed above the abutment ring $d$ and designed to remove remnants of cork or pieces of bark from said abutment ring $d$ so that they drop through a hole $h$ of the table. The abutment ring $d$ is narrowed at the part where said blade spring $e$ is situated and it has a depression $d'$ which permits of the working pieces projecting farther from the lower ends of the tubular holders $b$ at the part of the ring where the blade spring $e$ is situated. The working pieces are pushed against the abutment ring through the action of spiral springs arranged above the holder. The removing of the pieces of bark from the cork could not be effected without resistance if the corks were pressed against the abutment ring $d$ at the moment when the blade spring $e$ acts. In order to release the corks at the proper moment metal disks are fixed to the lower ends of the pressure springs which have lateral arms $x$ projecting through vertical slots of the tubular holders $b$. At the right and left of the part where the blade spring $e$ is arranged guide rails $f$ are provided mounted on brackets $f'$ said guide rails serving for lifting the lateral arms of the disks and consequently the pressure springs before the corresponding holder arrives at the blade spring $e$ so that the corresponding working piece is not under pressure when it comes in contact with said blade spring. The abutment ring $d$ has holes $g$ through which chips of cork or bark can drop into the hole $h$ of the table. The spring $e$ bears against the side of the cork rod at its lower end and tends to tilt the rod in its tube as long as said rod is long enough not to slip out of its tube if it moves over the depression $d'$, but if said rod becomes too short in consequence of the cutting off of the cork disks, the spring $e$ removes the small remnants of the cork rod from the abutment ring when the corresponding holder is moving over the depression.

I claim:—

1. Machine for cutting disks from rods of cork or bark or similar material comprising in combination a rotating circular knife, a turning platform, tubular holders for the cork rods on said platform, an abutment ring under the platform having a depression, and a blade spring bearing on said abutment ring near said depression and bearing against the cork rod to remove any remnant of said rods when the tubular holder travels over the depression, substantially as described and shown and for the purpose set forth.

2. Machine for cutting disks from rods of cork, comprising in combination, a rotating circular knife, a turning platform, tubular holders for the cork rods in said platform having vertical slots near the upper ends, an abutment ring under the platform having a depression, a blade spring bearing on said abutment ring near said depression and against the cork rod in the corresponding tubular holder and designed to remove the short ends of the cork rods, members pressing the cork rods on said abutment ring, lateral arms of said members projecting through said slots of said tubular holders, inclined guide rails at the sides of said abutment ring near said blade spring for lifting said pressing members, substantially as described and shown and for the purpose set forth.

3. Machine for cutting disks from rods of cork, comprising in combination a rotating circular knife, a turning platform, tubular holders for the cork rods in said platform, an abutment ring under the platform having a certain number of apertures and a depression at the part opposite said circular knife for the dropping out of chips of cork and short remnants of the cork rods, and a blade spring bearing on said abutment ring near said depression and designed to remove the remainders of said cork rods from said tubular holders, substantially as described and shown and for the purpose set forth.

In witness whereof I have hereunto set my hand in the presence of two witnesses.

AUGUST MINNEMANN.

Witnesses:
H. MEISSNER,
WM. STRUS.

Copies of this patent may be obtained for five cents each, by addressing the "Commissioner of Patents, Washington, D. C."